Sept. 8, 1964

Z. ARKUS-DUNTOV ETAL 3,147,815

SWING AXLE SUSPENSION

Filed Sept. 27, 1962

INVENTORS
Zora Arkus-Duntov,
Harold W. Krieger,
& Walter C. Zetye
BY W. F. Wagner
ATTORNEY

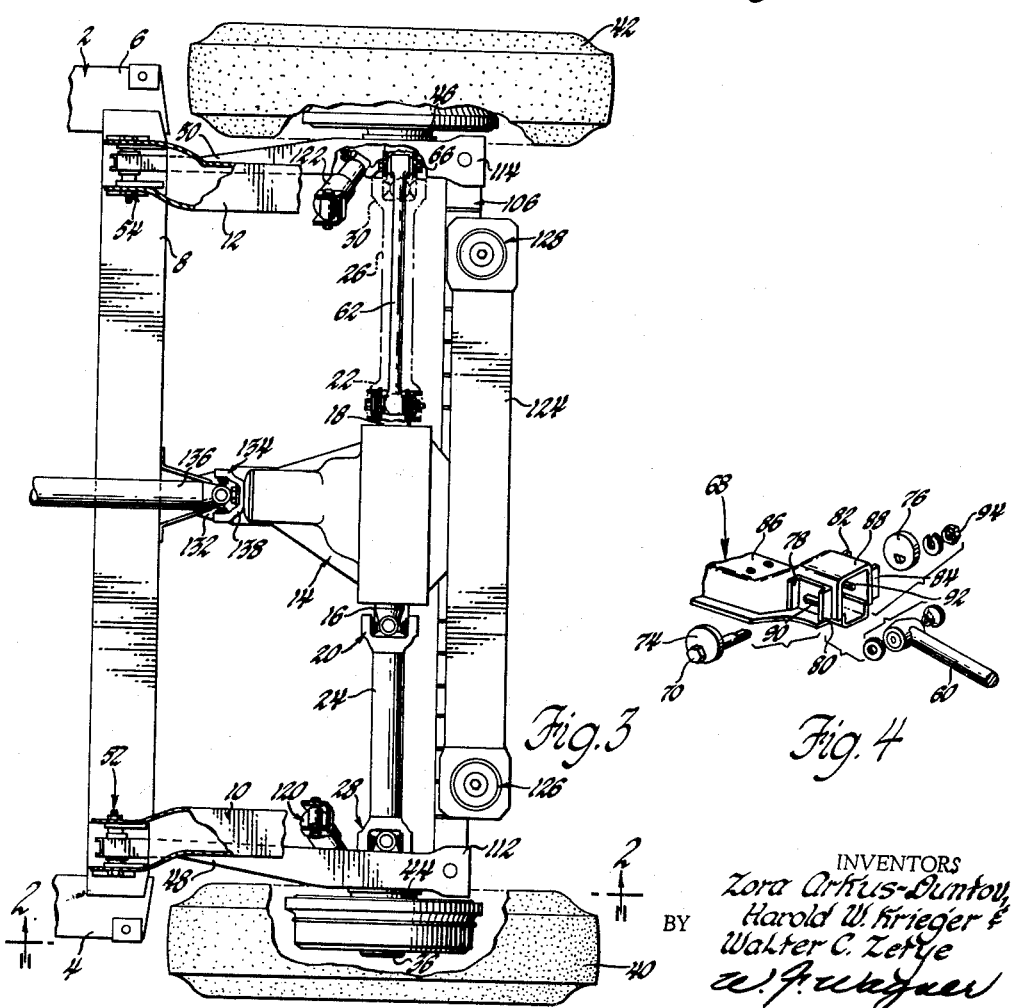

United States Patent Office

3,147,815
Patented Sept. 8, 1964

3,147,815
SWING AXLE SUSPENSION
Zora Arkus-Duntov, Grosse Pointe Shores, Harold W. Krieger, Ferndale, and Walter C. Zetye, Southfield, Mich., assignors to General Motors Corporation, Detroit, Mich., a corporation of Delaware
Filed Sept. 27, 1962, Ser. No. 226,620
5 Claims. (Cl. 180—73)

This invention relates to vehicle suspension and more particularly to swing axle suspension for vehicle driving wheels.

An object of the invention is to provide an improved independent wheel suspension for vehicles.

Another object is to provide an improved swing axle suspension.

A further object is to provide a swing axle suspension utilizing a transverse leaf spring as the load supporting elastic medium.

Still another object is to provide a swing axle suspension wherein a pair of rear wheels are operatively connected to a frame supported differential by means of laterally oppositely extending live half axles, the opposite ends of which are articulatably connected respectively to the associated wheel and the differential, each wheel being connected to the frame and guided through a predetermined deflection path by means of a three-element linkage formed in part by the live half axle associated therewith.

Yet a further object is to provide a swing axle suspension of the type described wherein the three-element linkage comprises a longitudinally extending torque arm having a wheel rotatably mounted thereon on a fixed axis normal to the plane of deflection of the arm, a transversely extending live axle, and a generally transversely extending control rod disposed beneath said live axle in non-parallel relation therewith.

Yet another object is to provide an arrangement of the stated character wherein the elements of the linkage are formed and arranged in a manner enabling selective adjustment of wheel camber angle without disturbing predetermined roll center height.

Still another object is to provide a suspension of the type described including means for mounting the differential on the frame in a manner providing a high degree of stability yet substantial road shock and noise isolation capability.

A still further object is to provide a suspension of the stated character wherein the connection between the elastic medium and the linkage is positive during compression deflection and impositive during rebound deflection.

These and other objects, advantages and features of the invention will become more fully apparent as reference is had to the accompanying specification and drawings wherein:

FIGURE 2 is a fragmentary side elevational view, partly in section and with parts broken away, of the suspension shown in FIGURE 1;

FIGURE 3 is a top plan view of the suspension, partly in section and with parts broken away; and FIGURE 4 is a fragmentary perspective view of a detail of the construction.

Figure 1:
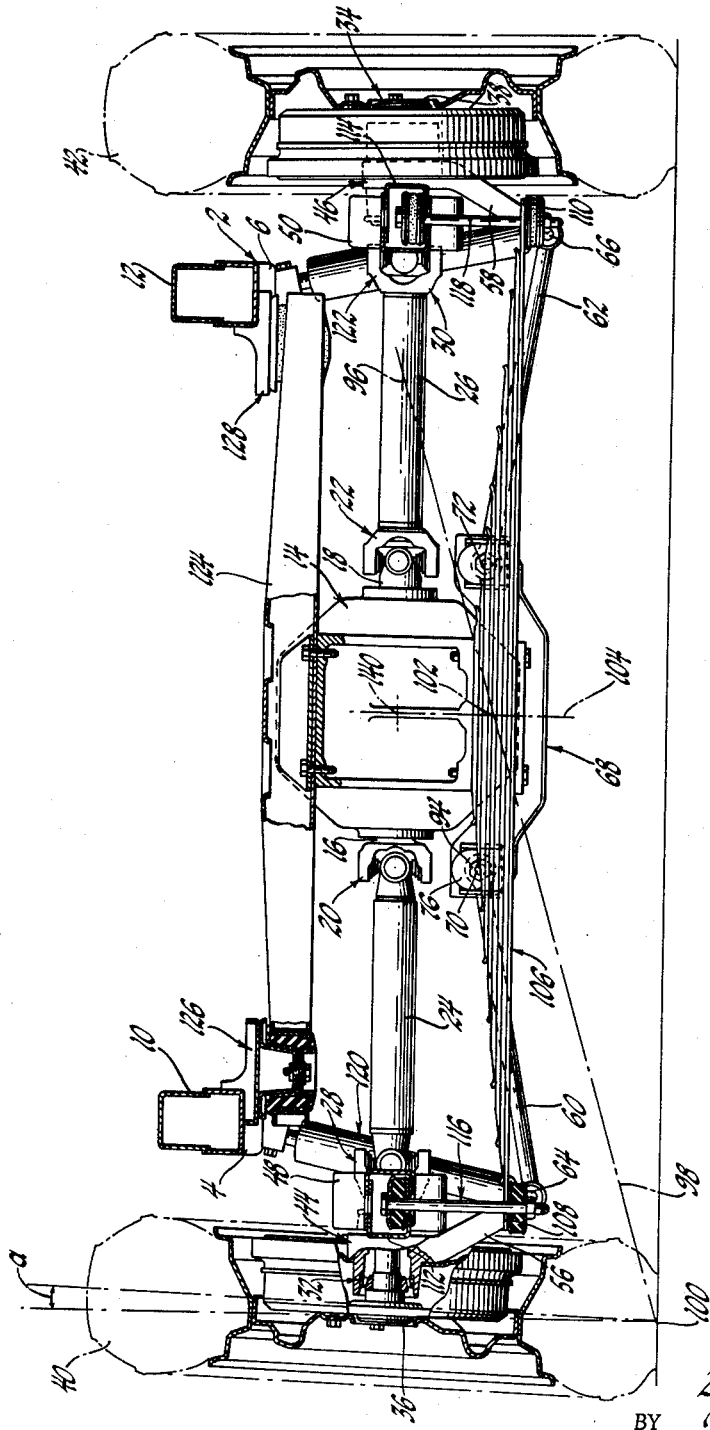
FIGURE 1 is a rear end elevational view of a suspension structure in accordance with the invention.

Referring now to the drawings, reference numeral 2 generally designates the vehicle frame or superstructure portion of the sprung mass of a vehicle which includes laterally spaced side rails 4 and 6. The rearward ends of rails 4 and 6 are connected by a cross frame member 8 having laterally spaced apart trailing kick-up portions 10 and 12 rigidly secured thereto. Disposed beneath kick-up portions 10 and 12 substantially laterally midway thereof and supported thereon in a manner to be described is a differential assembly 14 having laterally oppositely extending output members 16 and 18 to which are operatively connected by universal joints 20 and 22 the inboard ends of live half axles 24 and 26. The outboard ends of axles 24 and 26 in turn are operatively connected by universal joints 28 and 30 to wheel spindles 32 and 34. Spindles 32 and 34 are provided with bolt-on flanges 36 and 38 to which are attached driving wheels 40 and 42. A pair of spindle supports 44 and 46 rigidly secured on the outboard sides of torque arms 48 and 50 near the rearward ends thereof carry radial and axial thrust anti-friction bearings which rotatably supports wheels 40 and 42 relative to their respective torque arms. The forward ends of torque arms 48 and 50 in turn are pivotally attached to kick-up portions 10 and 12, respectively, by means of rubber bushed pin joints 52 and 54.

As seen best in FIGURES 1 and 2, wheel spindle supports 44 and 46 include integral depending inturned legs 56 and 58, the lower ends of which are pivotally connected respectively to the outboard ends of control rods 60 and 62 by means of pin joints 64 and 66. As seen best in FIGURE 1, control rods 60 and 62 extend laterally inwardly and upwardly for pivotal connection with a saddle bracket 68 rigidly secured to the underside of differential 14. To enable adjustment of the camber angle $a$ of wheels 40 and 42, the inboard pivotal connection for each rod 60 and 62 is accomplished by longitudinally extending bolts 70 and 72 which pass through the rods 60 and 62 and engage saddle bracket 68 in a manner enabling limited lateral translation relative thereto to the bracket 68. Inasmuch as the structure involved is identical for both rods, description of the connection will be limited to the rod 60 only. As seen best in FIGURE 4, bolt 70 includes a pair of longitudinally spaced washers 74 and 76 which are keyed to the bolt eccentric to the axis thereof. Washers 74 and 76, respectively, engage parallel vertically extending flanges 78 and 80 and 82 and 84 formed respectively on the front side wall 86 and rear side wall 88 of saddle bracket 68. Transversely elongated longitudinally aligned slots 90 and 92 formed in side walls 86 and 88 between flanges 78 and 80 and 82 and 84, respectively, permit bolt 70 to be moved laterally responsive to rotation of washers 74 and 76 between the respective flanges. After obtaining the desired lateral rotation, bolt 70 is secured against rotation and hence further lateral translation by tightening nut 94. Inasmuch as the linear distance between the outer and inner universal joints for each half axle is invariable, vertical inclination or camber of wheels 40 and 42 is determined by variation in the distance between the inboard and outboard pivotal connection of the associated control rod. In the present construction, for reasons shortly to be described, it is desirable that each wheel exhibit a predetermined degree of negative camber when the respective half axles are disposed in axial alignment.

In the embodiment shown, slight outward displacement of rod 60, for example, causes the wheel 40, spindle support 44 and torque arm 48 to rotate about an imaginary horizontal longitudinal axis passing through the geometric center of outer universal joint 28 and the geometric center of pin joint 52. Since this may be accomplished within limits, without imparting any angular inclination to half axle 24, the latter may be disposed in a true horizontal plane with the vehicle at design load, while the wheel assumes the desired negative camber. As a result, in the present invention it is possible to establish and maintain a desired vehicle roll center and thereafter impart the degree of wheel camber necessary for proper handling characteristic without causing accompanying change in the roll center. In the present construction, the roll center is determined by extending the projected axes of live axle 24 and control rod 60 to their imaginary point of intersection 96 and then inscribing a line 98 from said point of intersection to the ground contact point 100 of wheel 40. The point of intersection 102 between inscribed line 98 and a vertical line 104 extending through the vehicle centerline defines the instantaneous roll center of the vehicle. Since slots 90 and 92 extend substantially along the line of lateral translation of rod 60, adjustment of the latter will not influence the roll center but will enable significant camber adjustment to secure optimum vehicle handling characteristics. It will be understood, of course, that the adjustments described are to be performed at both sides of the vehicle.

In order to elastically support the vehicle superstructure relative to wheels 40 and 42 in accordance with the invention, the central portion of a multiple leaf transverse spring 106 is rigidly secured to the lower surface of differential 14 rearwardly of saddle 68 and has its outer extremities 108 and 110 connected to the terminal extremities 112 and 114 of torque arms 48 and 50 by means of drop links 116 and 118. In the embodiment shown, positive engagements occur only when the suspension is subjected to compression deflection, thereby permitting rebound control to be exerted exclusively by hydraulic shock absorbers 120 and 122 connected between spindle supports 44 and 46 and pick-up portions 10 and 12.

In accordance with a feature of the invention, means are provided for supporting the differential on the vehicle frame in a manner affording a high degree of stability about the longitudinal axis of the former. As seen best in FIGURE 1, differential 14 is rigidly secured to a transversely elongated beam 124, the outer extremities of which are yieldably supported on frame kick-up portions 10 and 12 by elastic shear mounts 126 and 128. The relatively wide spacing of mounts 126 and 128 serve to resist rotation of differential 14 about its longitudinal axis yet afford substantial road shock and noise isolation capability.

In addition to the beam mounting just described, differential 14 is stabilized against acceleration torque reaction by means of an elastic buffer 130 disposed between cross member 8 and a forwardly projecting bracket 132 mounted beneath differential 14. As seen best in FIGURE 2, buffer 130 is located slightly forwardly of and below the universal joint connection 134 between propeller shaft 136 and differential input 138 and forms with mounts 126 and 128 a plane passing through the geometric center 140 of differential 14. As a result, the entire differential is resiliently maintained in a stable attitude.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. In a vehicle having a frame mounted differential, independent wheel suspension comprising a transversely extending live axle articulatably connected at one end to said differential and at the other end to a spindle having a wheel mounted thereon, a longitudinally extending torque arm pivotally connected at its forward end to said vehicle, a spindle support extending through and rigidly mounted in said torque arm near the rearward end thereof, a depending arm integral with said spindle support, a transverse control link pivotally connected at its opposite ends to said differential and the lower extremity of said depending arm in a vertical transverse plane containing said live axle, a normally vertically deflectable leaf spring anchored on said differential, pivotal means connecting the other end of said spring to the rearward extremity of said torque arm in a manner enabling the torque arm rearward end to move in any direction without inducing spring deflection other than in said normal direction of deflection, said pivotal means comprising a drop link pivotally connected respectively at its lower and upper ends to said spring and said torque arm.

2. The structure set forth in claim 1 wherein said link connection is positive acting only under conditions of compression deflection of said spring.

3. The structure set forth in claim 2 including damper means disposed between said torque arm and frame operable to control rebound deflection of said suspension.

4. In a motor vehicle having a frame including parallel side rails and a cross member, a beam extending transversely of said frame, elastic mounts connecting the opposite ends of said beam to said side rails, a differential rigidly secured to said beam and depending therefrom, said differential including a longitudinally forwardly extending input member, a power shaft extending longitudinally of said vehicle, bracket means on said differential extending forwardly beneath and vertically aligned with said input, an elastic buffer connecting said bracket to said cross member, a pair of generally parallel longitudinally extending torque arms connected at their forward ends to said cross member, a wheel assembly rotatably mounted on the other end of each of said arms, a pair of laterally oppositely directed live axles articulatably connected at their inboard ends to said differential, means articulatably connecting the outer ends of each axle to the adjacent wheel, a transversely extending control rod spaced vertically beneath each said live axle and articulatably connected at its opposite ends to the adjacent torque arm and said differential respectively, and a transverse semi-elliptic leaf spring disposed between said differential and said torque arm to elastically support said vehicle relative to said wheels.

5. The structure set forth in claim 4 wherein said elastic mounts and said elastic buffer define a plane passing through the geometric center of said differential.

References Cited in the file of this patent

UNITED STATES PATENTS

| | | |
|---|---|---|
| 1,591,750 | Dumont | July 6, 1926 |
| 2,157,773 | Probst | May 9, 1939 |
| 2,809,707 | Leggat | Oct. 15, 1957 |
| 2,833,366 | Olley | May 6, 1958 |